United States Patent [19]

Tanaka

[11] Patent Number: 5,608,705
[45] Date of Patent: Mar. 4, 1997

[54] DISK LOADING APPARATUS WITH ROTATIONALLY ENGAGING DISK TABLE

[75] Inventor: Akira Tanaka, Tokyo, Japan

[73] Assignee: Sony Corporation, Tokyo, Japan

[21] Appl. No.: 351,713

[22] Filed: Dec. 8, 1994

Related U.S. Application Data

[62] Division of Ser. No. 33,143, Mar. 16, 1993, abandoned.

[30] Foreign Application Priority Data

Mar. 19, 1992 [JP] Japan ................................. 4-093825

[51] Int. Cl.$^6$ ............................................. G11B 33/02
[52] U.S. Cl. ........................................ 369/77.1; 369/75.2
[58] Field of Search ................................. 369/75.1, 75.2, 369/77.1, 77.2, 263, 247

[56] References Cited

U.S. PATENT DOCUMENTS

| | | | |
|---|---|---|---|
| 3,832,047 | 8/1974 | Haake | 352/109 |
| 3,976,262 | 8/1976 | Kennedy | 242/192 |
| 4,332,542 | 6/1982 | Matsui | 425/459 |
| 4,561,085 | 12/1985 | Funabashi | 369/77.1 |
| 4,756,463 | 7/1988 | Sugiyama | 778/37 |
| 4,802,041 | 1/1989 | Uehara | 360/99.06 |
| 4,862,445 | 8/1989 | Sasaki | 369/75.2 |
| 4,922,478 | 5/1990 | Verhagen | 369/247 |
| 4,922,766 | 5/1990 | Ahn | 74/385 |
| 4,968,355 | 11/1990 | Johnson | 136/246 |
| 4,979,160 | 12/1990 | Araki | 369/75.2 |
| 5,047,881 | 9/1991 | Uehara | 360/99.05 |
| 5,067,121 | 11/1991 | Einhaus | 369/75.2 |
| 5,105,414 | 4/1992 | Funabashi et al. | 369/75.2 |
| 5,123,005 | 6/1992 | Kurosu | 369/77.1 |
| 5,204,850 | 4/1993 | Ohata | 369/75.2 |

FOREIGN PATENT DOCUMENTS

| | | | |
|---|---|---|---|
| 0216442A2 | 4/1987 | European Pat. Off. | |
| 0416797A2 | 3/1991 | European Pat. Off. | |
| 2653259 | 4/1991 | France. | |
| 3835210A1 | 5/1989 | Germany. | |
| 2-98863 | 4/1990 | Japan | 369/247 |
| 4-62157 | 2/1992 | Japan. | |
| 1494033 | 7/1989 | U.S.S.R. | 369/75.1 |
| 2227594A | 8/1990 | United Kingdom. | |

OTHER PUBLICATIONS

Product Engineering, "18 Ways to Control Backlash in Gearing", pp. 71–75, Oct. 1959, Gutmann.

*Primary Examiner*—Stuart S. Levy
*Assistant Examiner*—William J. Klimowicz
*Attorney, Agent, or Firm*—Limbach & Limbach L.L.P.

[57] ABSTRACT

A disk table engages a disk by raising and lowering a movable base that is rotationally connected to a stationary base. The movable base is raised and lowered by raising and lowering a rotatable member which is rotatably connected to the stationary base, and rotatably connected to the movable base.

8 Claims, 12 Drawing Sheets

DISK LOADING APPARATUS WITH ROTATIONALLY ENGAGING DISK TABLE

This is a divisional of application Ser. No. 08/003,143, filed Mar. 16, 1993, now abandoned.

BACKGROUND OF THE INVENTION

1. Field of the Invention

This invention relates to a disk loading apparatus suitable for use with, for example, a compact disk player.

2. Description of the Related Art

Various disk loading apparatus are conventionally known and incorporated in various apparatus such as a compact disk player. An exemplary one of such conventional disk loading apparatus is shown in FIG. 13. Referring to FIG. 13, the disk loading mechanism shown includes a loading motor 2 mounted on a main chassis 1. A motor pulley 3 is securely mounted on a rotary shaft of the loading motor 2. A belt 5 extends around the motor pulley 3 so that rotation of the motor pulley 3 is transmitted to a loading pulley 4 mounted for rotation on the main chassis 1. An intermediate gear 6 and a drive gear 7 are mounted on the main chassis 1, and rotation of the loading pulley 4 is transmitted to the drive gear 7 via the intermediate gear 6.

A tray 8 having a disk receiving portion 10 for receiving a disk thereon is supported for movement on the main chassis 1 under the guidance of a plurality of guide elements 11. A rack 9 is formed on one of a pair of inner side faces of the tray 8 for engaging the drive gear 7.

When the loading motor 2 is energized to rotate, the rotation thereof is transmitted to the rack 9 via the motor pulley 3, the loading pulley 4, the belt 5, the intermediate gear 6 and the drive gear 7. As a result, the tray 8 is moved relative to the main chassis 1. Consequently, a disk placed on the receiving portion 10 of the tray 8 is loaded to or unloaded from a predetermined position.

In the conventional compact disk player, the axes of rotation of the rotational elements of the drive system from the loading motor 2 to the drive gear 7 thus extend in a direction perpendicular to the direction of advancing and retracting movement of the tray 8. Accordingly, the conventional compact disk player has a problem in that a comparatively great dimension is required in a direction perpendicular to the direction of advancing and retracting movement of the tray, that is, in the vertical direction of the compact disk player and it is difficult to reduce the dimension and hence the overall thickness of the compact disk player.

SUMMARY OF THE INVENTION

A disk loading apparatus in accordance with the present invention includes a stationary base and a movable base that is rotatably connected to the stationary base by first connecting means. In the present invention, the movable base supports both an optical pickup and means for driving an optical disk. In addition, a rotatable member is rotatably connected to the stationary base, and rotatably connected to the movable base by second connecting means. The movable base moves between a first position and a second position in response to the movement of the rotatable member. The rotatable member, in turn, moves in response to the movement of second driving means.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
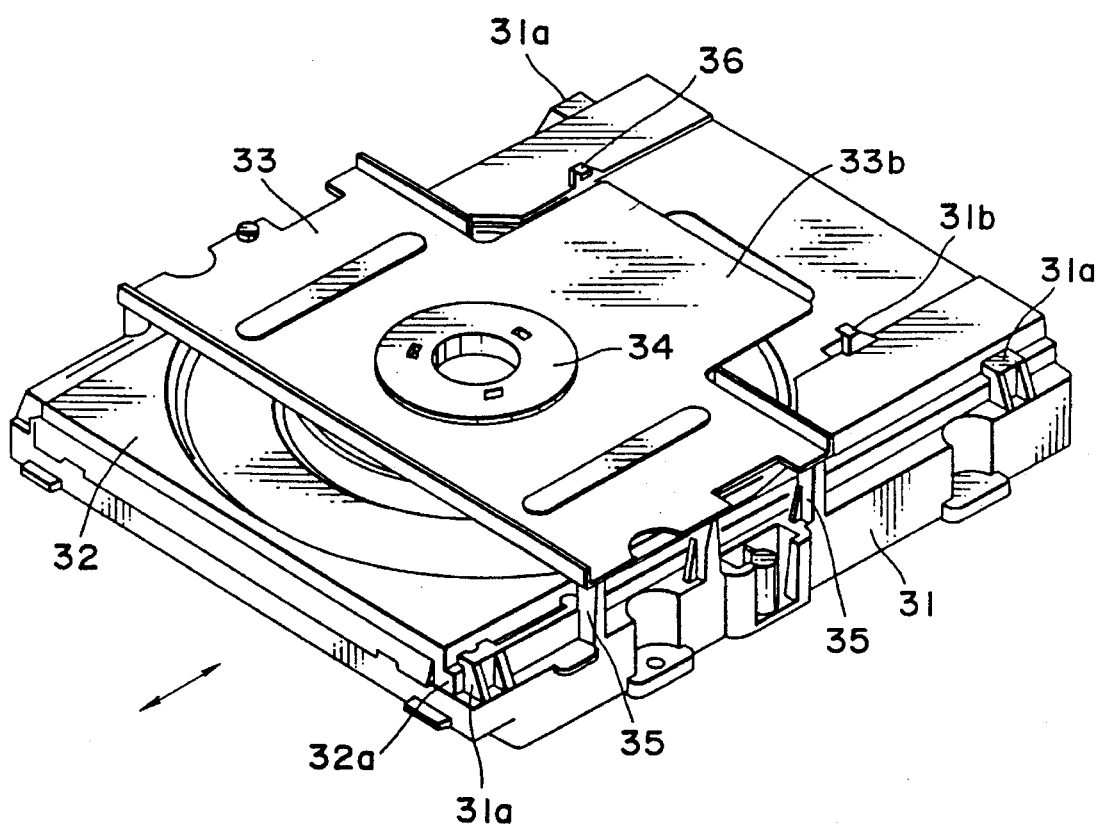
FIG. 1 is a perspective view of a disk loading apparatus showing a preferred embodiment of the present invention.

Referring first to FIGS. 1 to 5, there is shown a disk loading apparatus to which the present invention is applied. The disk loading apparatus shown includes a main chassis 31 having two pairs of guide elements 31a formed at side portions thereof, and a tray 32 having a pair of rails 32a in the form of ribs formed thereon and held in engagement with the guide elements 31a. Consequently, the tray 32 is mounted for movement in directions indicated by double-sided arrow marks in FIGS. 1, 3 and 5 on the main chassis 31.

A plurality of pairs of projections 35 are formed on the main chassis 31, and a chucking chassis 33 is secured to the projections 35 individually by means of screws. A hole 33a is formed in the chucking chassis 33, and a chucking pulley member 34 including a chucking pulley 34a of a small diameter and another chucking pulley 34b of a large diameter is held for rotation in the hole 33a. The chucking pulley 34b cooperates with a turntable 53 (FIG. 5) to chuck therebetween a disk 99 (FIG. 12) received on the turntable 53.

An annular recess 38 for receiving a disk 92 thereon is formed on the tray 32, and a hole 37, in which the turntable 53 and a pickup 52 are disposed, is formed in the recessed portion 38. Further, a pair of arresting portions 36 in the form of bent lugs are formed at left and right locations rearwardly of the tray 32. When the tray 32 is retracted to its most interior position (rightmost position in FIGS. 3 and 5) with respect to the main chassis 31, a projected portion 33b of the chucking chassis 33 is positioned in the proximity of the arresting portions 36. Further, a rack 68 is formed on a side portion (upper portion in FIG. 5) of the tray 32, and a pin 40 is implanted at a rear portion on the opposite side portion of the tray 32. The pin 40 is engaged with a projection 41 formed on the main chassis 31 when the tray 32 is advanced to a predetermined position which is a position in FIG. 5, that is, a most advanced position from a main body 98 of the disk loading apparatus shown in FIG. 12.

Figure 3:
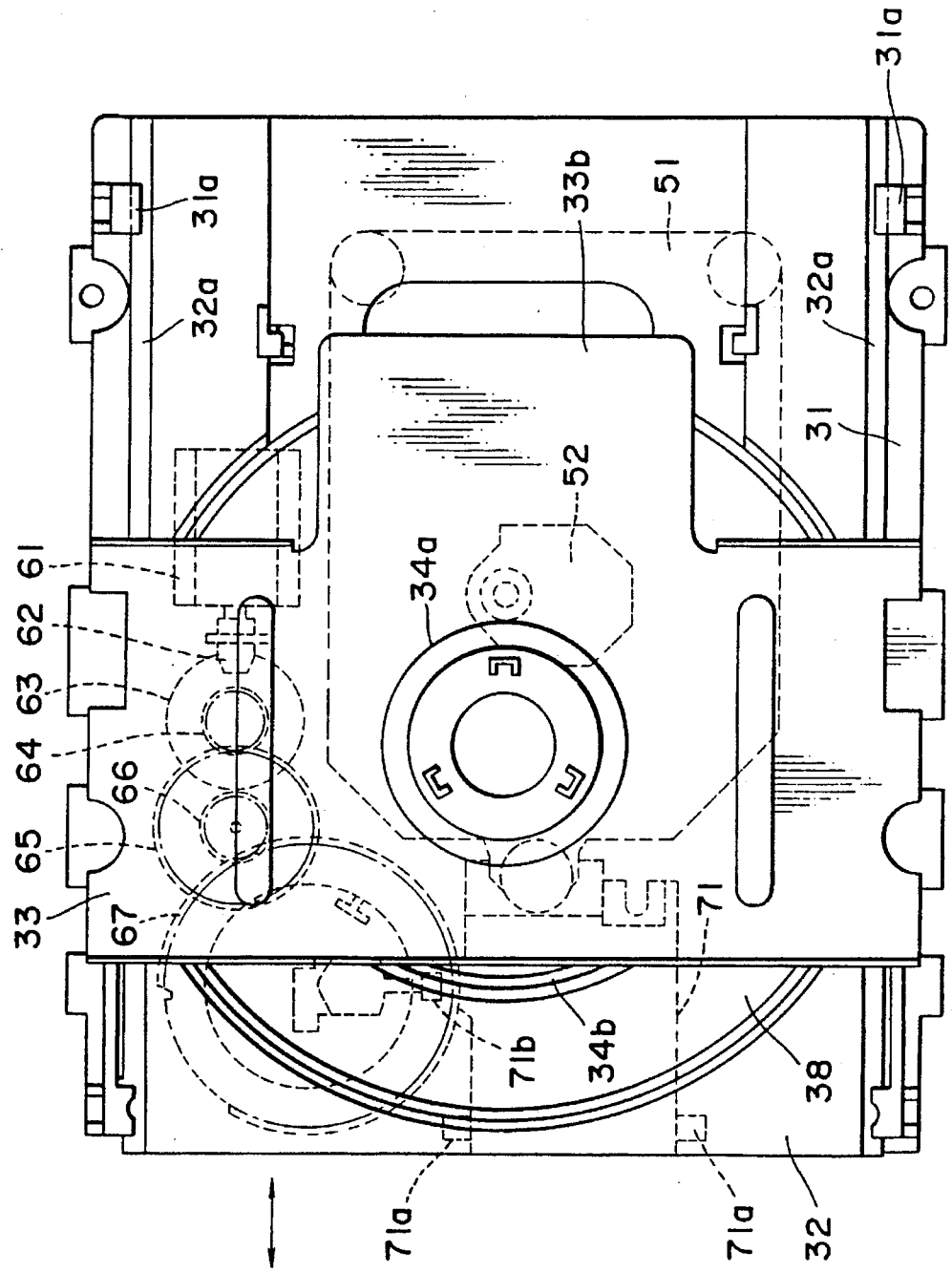
FIG. 3 is a plan view of the disk loading apparatus of FIG. 1 when a tray is at its retracted position.
Figure 4:
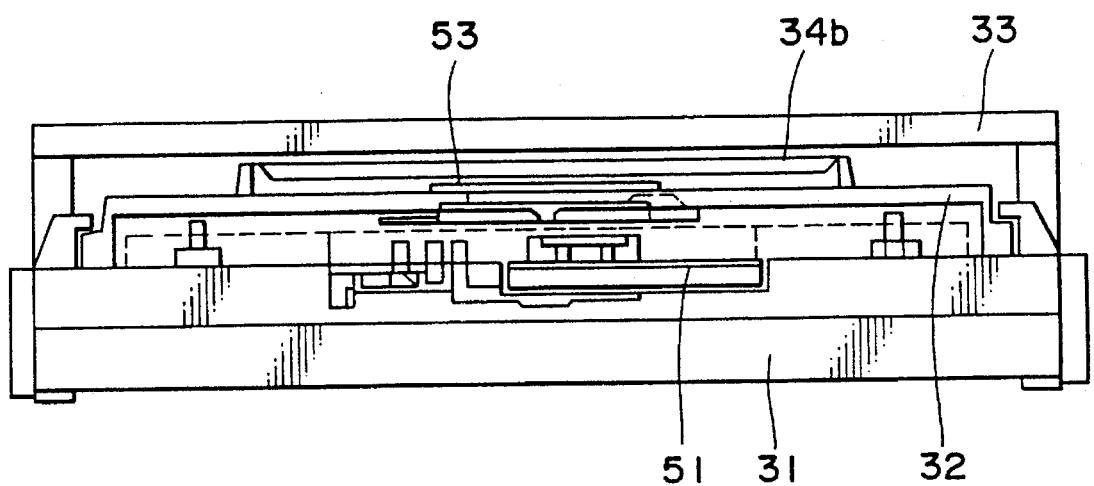
FIG. 4 is a front elevational view of the disk loading apparatus shown in FIG. 1.
Figure 5:
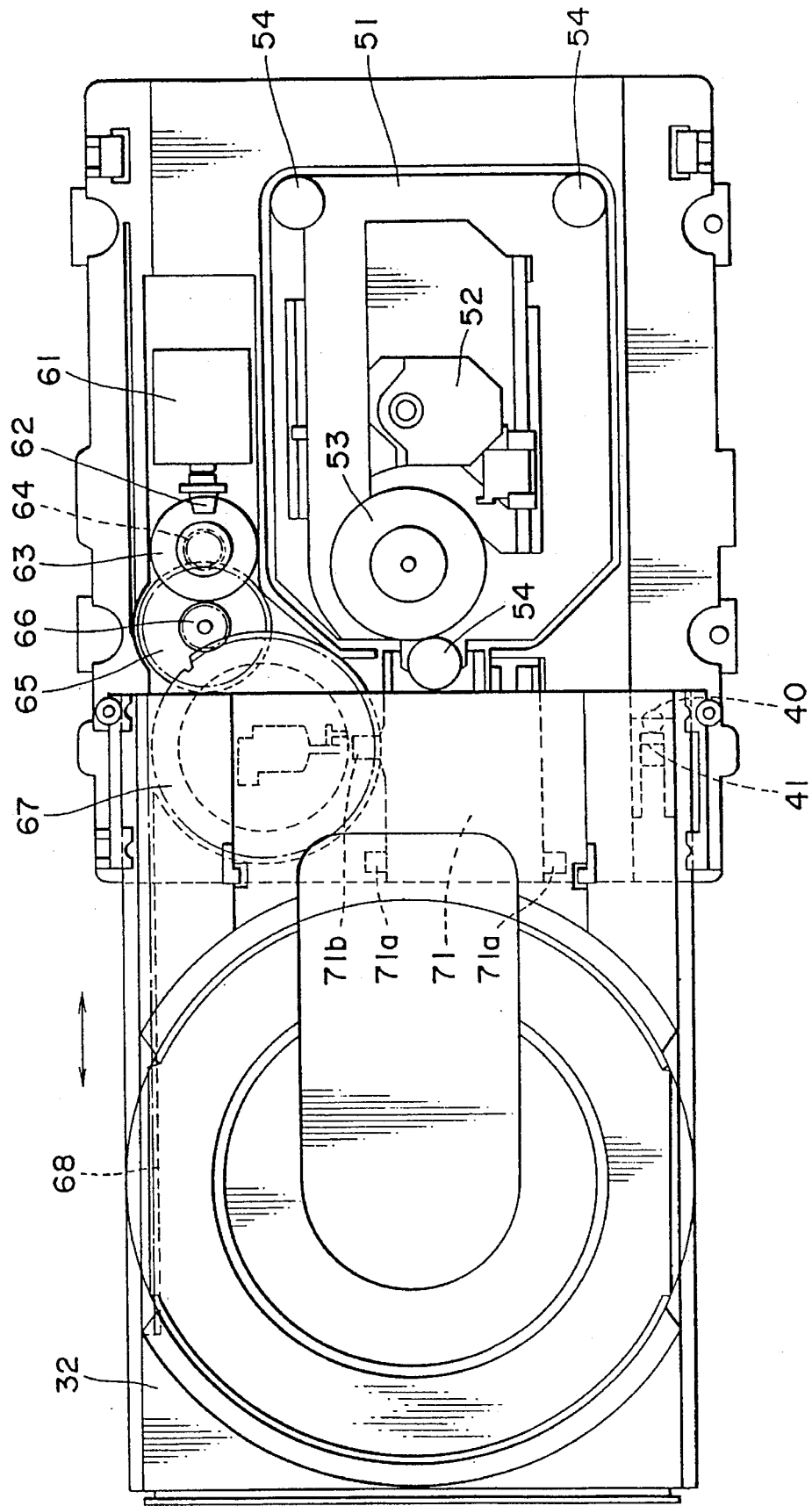
FIG. 5 is a plan view of the disk loading apparatus of FIG. 1 when the tray is at its advanced position.

As particularly shown in FIGS. 3 and 5, a loading motor 61 having a generally elliptical profile is mounted on the main chassis 31 such that a rotary shaft thereof extends in parallel to the advancing and retracting direction of the tray 32, that is, parallel to the plane of each of FIGS. 3 and 5. A motor pulley 62 made of a synthetic resin is coupled to an end of the rotary shaft of the loading motor 61. A tapered face 62a is formed on the motor pulley 62. A loading pulley 63, which is made of, for example, silicon rubber, is supported for rotation on the main chassis 31 such that a rotary shaft thereof extends perpendicularly to the rotary shaft of the loading motor 61. Also the loading pulley 63 has a tapered face 63a, which contacts with the tapered face 62a of the motor pulley 62 so that rotation of the motor pulley 62 is transmitted to the loading pulley 63.

Figure 6:
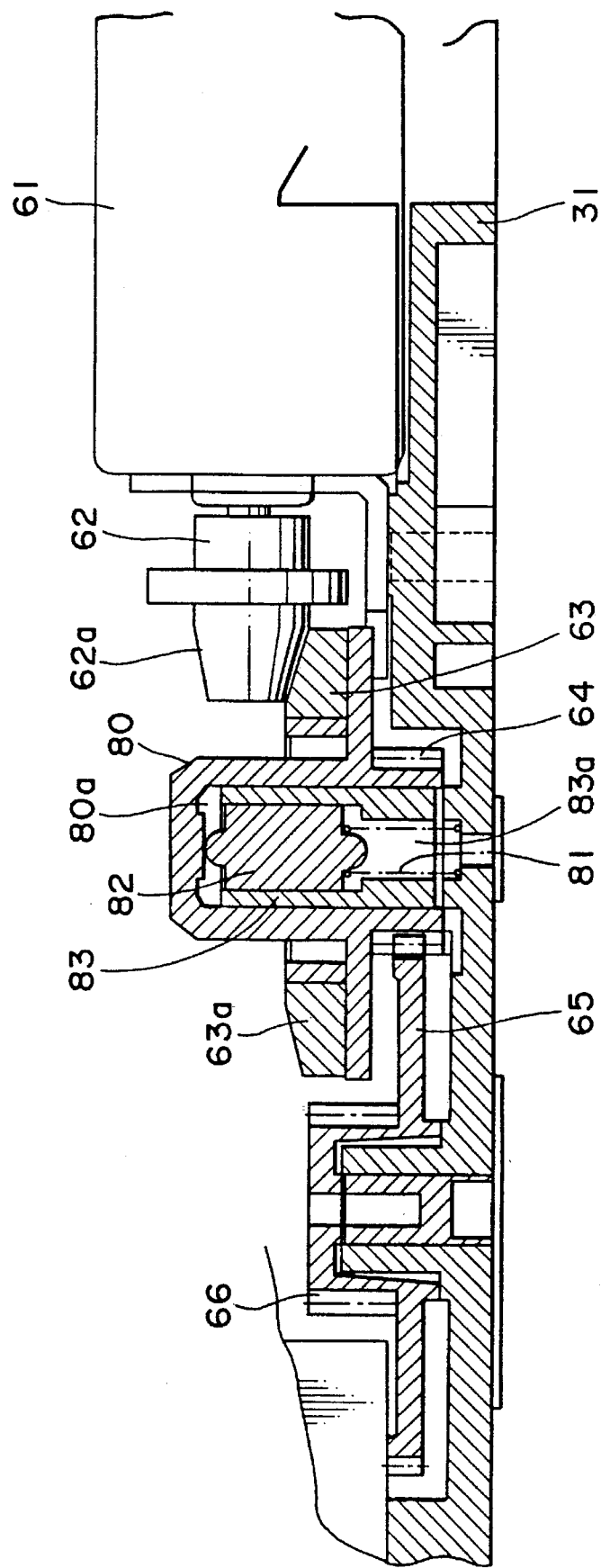
FIG. 6 is an enlarged sectional view showing detailed construction of a motor pulley and a loading pulley of the disk loading apparatus of FIG. 1.

Referring also to FIG. 6, the loading motor 63 has a rotary shaft 80 at the center thereof and has a cavity 80a formed in the inside thereof. A pin 83 is formed on the main chassis 31 and fitted in the cavity 80a. A cavity 83a is formed in the pin 83, and a spring 81 and a pin 82 are inserted in the cavity 83a. The spring 81 normally urges the pin 82 upwardly in FIG. 6 so that an upper end portion of the pin 82 in FIG. 6 urges an inner wall of the rotary shaft 80 upwardly, and as a result. The tapered face 63a of the loading pulley 63 is held in contact under pressure with the tapered face 62a of the motor pulley 62. Consequently, rotation of the motor pulley 62 is transmitted with certainty to the loading pulley 63.

A gear 64 is formed coaxially on the rotary shaft 80 of the loading motor 63 below the loading pulley 63. The gear 64 is held in meshing engagement with another gear 65, and a further gear 66 of a small diameter is coupled coaxially to the gear 65. The gear 66 is held in meshing engagement with a drive gear 67, which is held in meshing engagement with the rack 68 on the tray 32.

Figure 7:
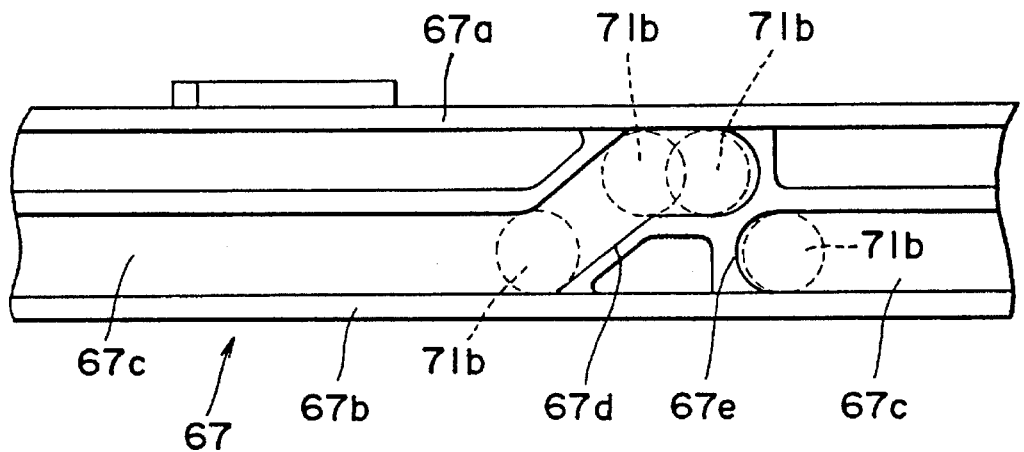
FIG. 7 is a schematic view showing a cam formed on a side face of a drive gear of the disk loading apparatus of FIG. 1.

Referring to FIGS. 3, 5 and 7, the drive gear 67 includes an upper gear 67a and a lower gear 67b which has a cam 67c in the form of a cam groove formed between the gears 67a and 67b. A pin 71b is formed on a pivotal plate 71 (FIG. 3) and is fitted in the cam 67c. Consequently, as the drive gear 67 rotates, the pin 71b is guided by the cam 67c so that the pivotal plate 71 is pivoted in a direction perpendicular to the plane of FIG. 3 around a common axis of a pair of projections 71a at which the pivotal plate 71 is supported for rotation on the main chassis 31.

Figure 2:
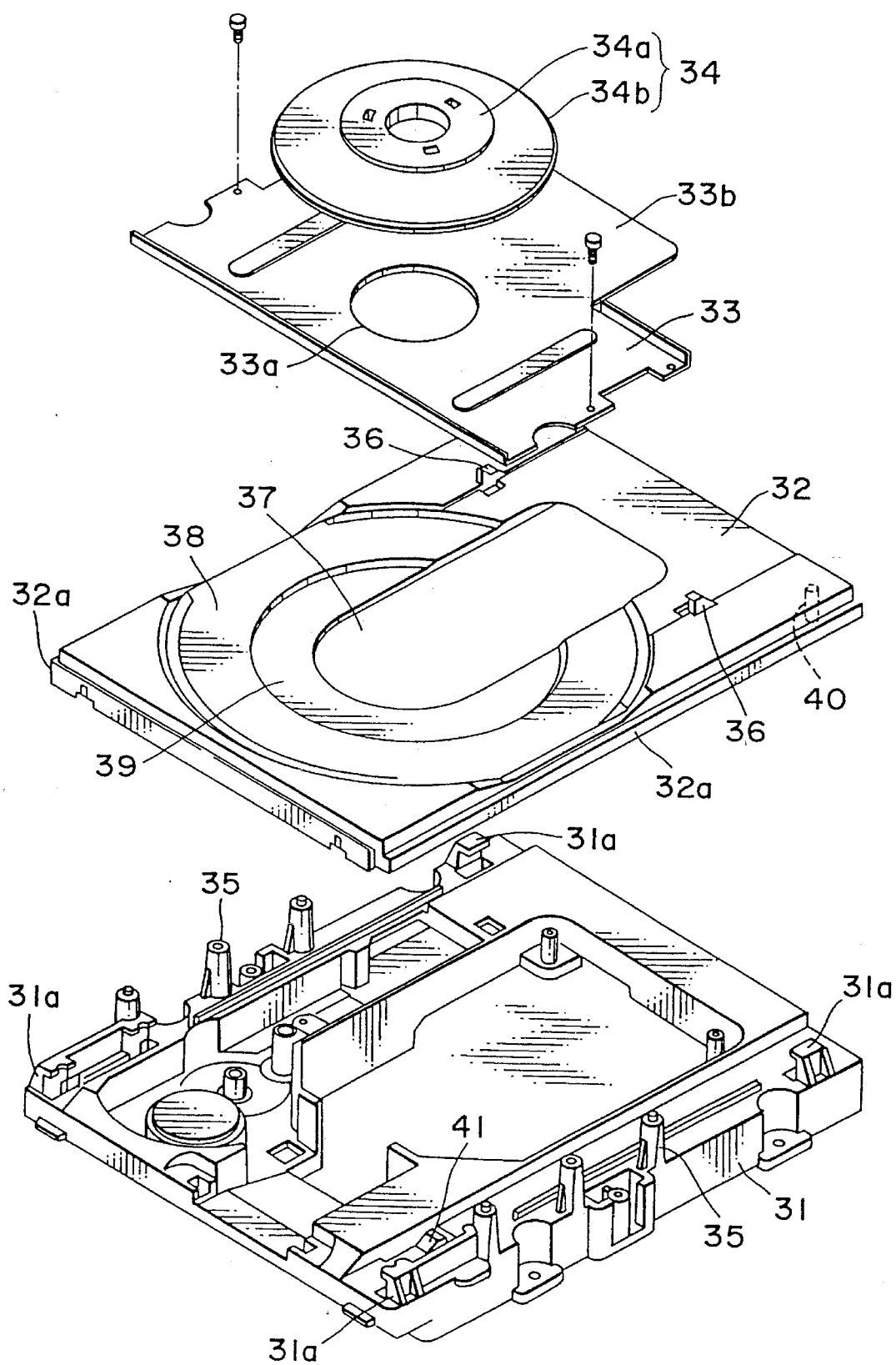
FIG. 2 is an exploded perspective view of the disk loading apparatus shown in FIG. 1.

Referring to FIGS. 3 and 5, a turntable chassis 51 is disposed in the hole 37 shown in FIG. 2. The turntable chassis 51 is supported on the main chassis 31 by means of three insulators 54. The turntable 53 and the pickup 52 are disposed on the turntable chassis 51. The turntable 53, rotates a disk 99 (FIG. 12) when the disk 99 is received thereon. When the disk 99 is received on the turntable 53, the chucking pulley 34b shown in FIG. 2 presses the disk 99 against the turntable 53. The pickup 52 is mounted for movement in the leftward and rightward directions of FIG. 5 on the turntable chassis 51.

Figure 8:
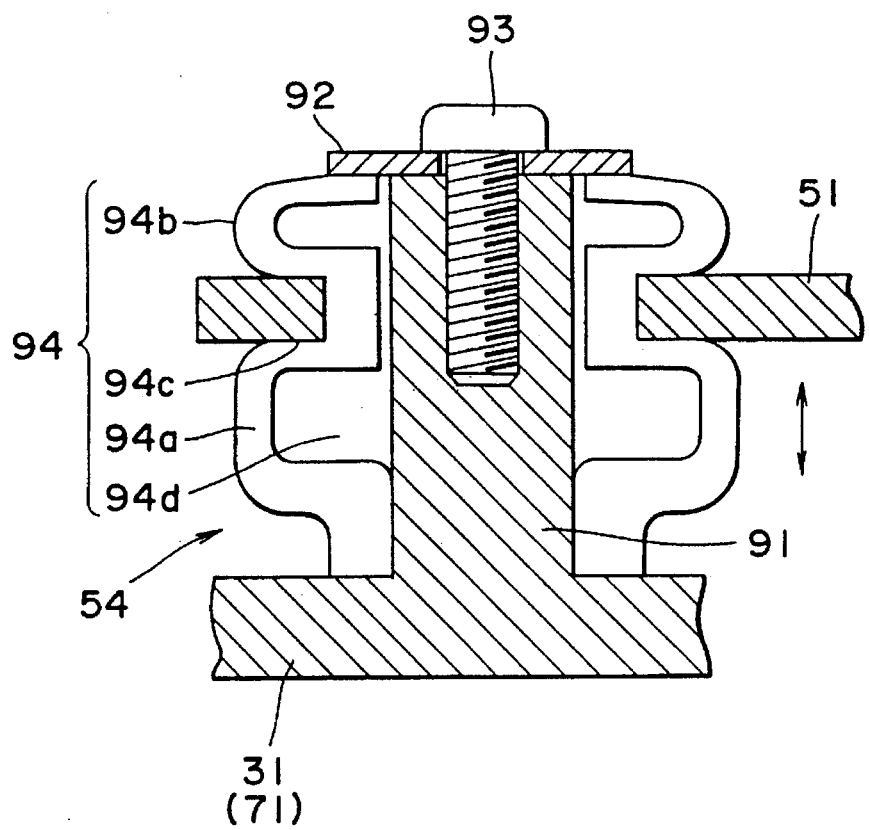
FIG. 8 is an enlarged sectional view showing detailed construction of an insulator of the disk loading apparatus of FIG. 1.

Referring now to FIG. 8. an insulator 54 is shown in detail. The insulator 54 shown includes a member 94 formed from rubber. The member 94 has a pair of swollen portions 94a and 94b swollen outwardly and has, between the swollen portions 94a and 94b, an inwardly recessed concave portion 94c, in which the turntable chassis 51 is received. A hollow 94d is formed in the inside of the member 94, and a pin 91 formed either on the main chassis 31 or on the pivotal plate 71 is inserted in the hollow 94d of the member 94. A screw 93 is screwed in the pin 91 with a washer 92 interposed therebetween. Otherwise possible letting off of the member 94 from the pin 91 is prevented by the washer 92.

Consequently, even if the main chassis 31 is vibrated by external vibrations, the vibrations thereof are attenuated by the member 94 so that the vibrations may not be transmitted very much to the turntable chassis 51. Further, the distance between the concave portion 94c and the pin 91 is set comparatively large so that not only the turntable chassis 51 is movable by a small distance in the upward and downward directions in FIG. 8, but also the turntable chassis 51 can be inclined or pivoted within a predetermined angular range relative to the main chassis 31.

Figure 9:
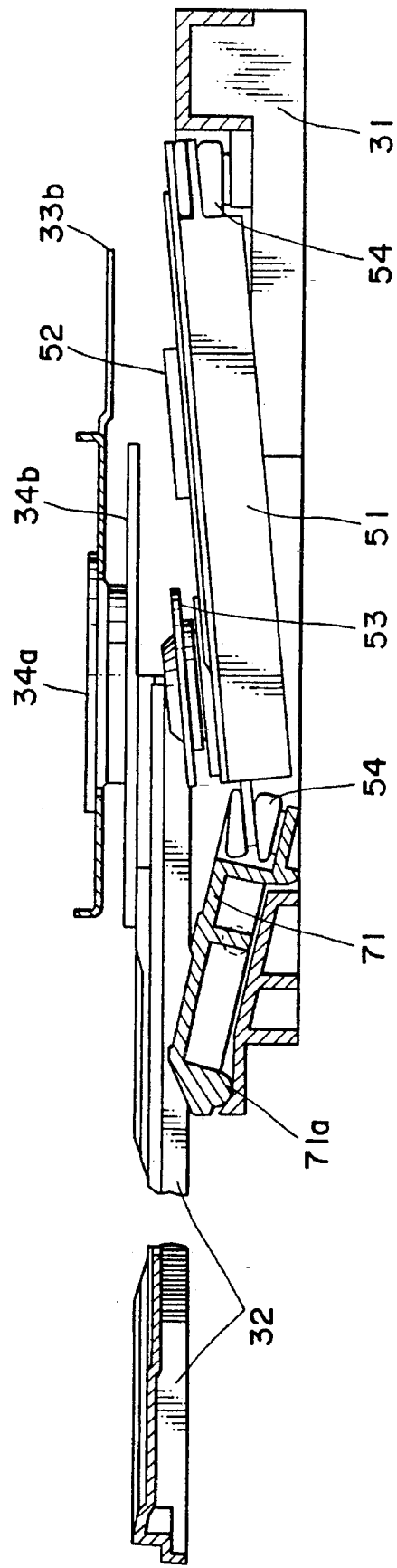
FIG. 9 is a side elevational sectional view of the disk loading apparatus when the tray is at its outwardly drawn out position.
Figure 10:
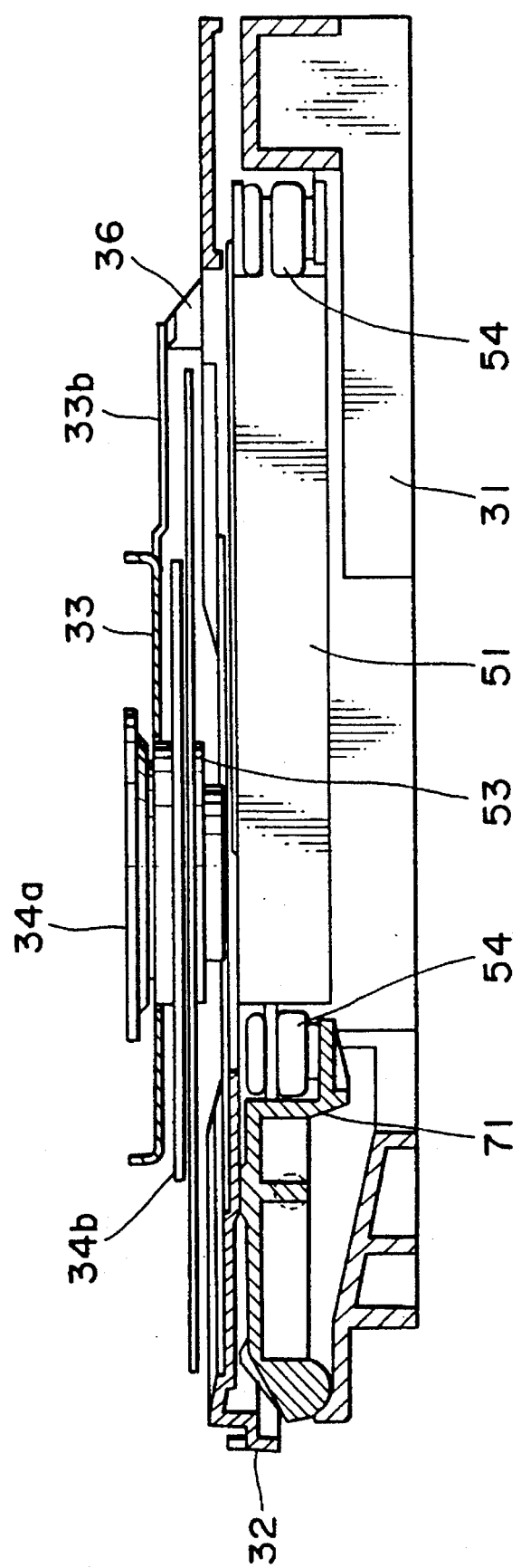
FIG. 10 is a side elevational sectional view of the disk loading apparatus when the tray is at its inwardly accommodated position.

Such pivotal motion between the pivotal plate 71 and the turntable chassis 51 around the insulator 54 can be seen from FIGS. 9 and 10. FIG. 9 particularly shows the disk loading apparatus in a condition wherein the tray 32 is advanced outwardly from the main chassis 31. In the position shown in FIG. 9, the pivotal plate 71 is at its position pivoted in the clockwise direction in FIG. 9 around the common axis of the projections 71a. Meanwhile, the turntable chassis 51 is at its position pivoted in the counterclockwise direction around the other two insulators 54 only one of which is shown at a right portion in FIG. 9. While the turntable chassis 51 and the pivotal plate 71 are coupled to each other by way of the insulator 54 shown on the left side in FIG. 9, since the insulator 54 supports the turntable chassis 51 for pivotal motion thereon as described hereinabove, such pivotal motion of the turntable chassis 51 is allowed by the insulator 54.

When the turntable 53 is at its downwardly moved position shown in FIG. 9, even if the tray 32 is moved rightwardly in FIG. 9, the turntable 53 will not interfere with the tray 32 at all.

On the other hand, when the tray 32 is retracted to a predetermined position, the turntable chassis 51 and the pivotal plate 71 are returned to their horizontal positions as shown in FIG. 10. Consequently, the turntable 53 projects upwardly and is inserted into the center hole of a disk transported thereto by the tray 32. As a result, the disk is chucked between the chucking pulley 34 and the turntable 53.

Subsequently, operation of the disk loading apparatus will be described. Now, if an instruction of advancement of the tray 32 is issued when the tray 32 is accommodated at the rightmost position with respect to the main chassis 31 as shown in FIG. 3, the loading motor 61 is energized to rotate. The rotation of the loading motor 61 is transmitted to the drive gear 67 by way of the motor pulley 62, the loading pulley 63, the gear 64, the gear 65 and the gear 66. In this instance, when the rotation is transmitted from the motor pulley 62 to the loading pulley 63, the direction of the axis of rotation is turned by 90 degrees as seen from FIG. 6.

Consequently, the drive gear 67 is rotated in the counterclockwise direction in FIG. 3. Since the drive gear 67 is held in meshing engagement with the rack 68 of the tray 32 as shown in FIG. 5, the rack 68 is moved in the leftward direction in FIG. 3 until it projects from the main chassis 31 as shown in FIG. 5.

When the tray 32 is in its accommodated position shown in FIG. 3, the pin 71b of the pivotal plate 71 remains fitted at an upper portion of the cam 67c shown in FIG. 7. Then, when the drive gear 67 rotates, the pin 71b moves in the downward direction in FIG. 7 following an inclined face 67d of the cam 67c. As a result, the pivotal plate 71 is pivoted in the clockwise direction as shown in FIG. 9 around the common axis of the projections 71a. Since the turntable chassis 51 is coupled to the pivotal plate 71 by way of the insulator 54, the turntable chassis 51 is pivoted simultaneously in the counterclockwise direction in FIG. 9. Since the turntable chassis 51 is pivoted downwardly in this manner, the tray 32 can be moved to the unloading position without trouble.

Figure 11:
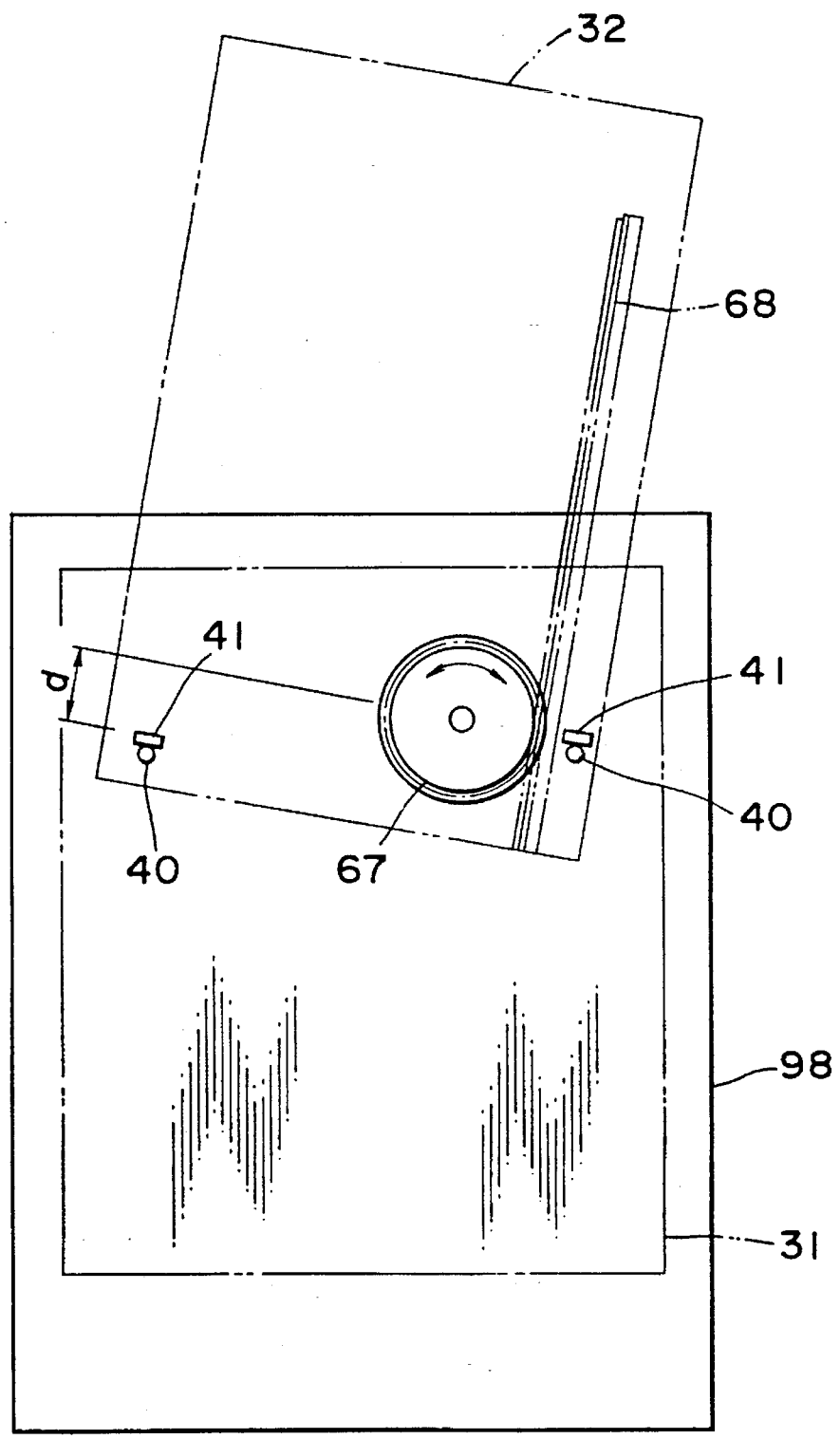
FIG. 11 is a reduced schematic view of the disk loading apparatus when the tray is at its fully outwardly drawn out position.

When the tray 32 is advanced to the predetermined position, the right side pin 40 of the tray 32 is contacted with the corresponding projection 41 of the main chassis 31 as shown in FIG. 11. Consequently, a right side portion of the tray 32 in FIG. 11 cannot be advanced any more from the main body 98.

In the meantime, the drive gear 67 is still driven so that the tray 32 may be advanced further from the main body 98. As a result, only a left side portion of the tray 32 in FIG. 11 is advanced forwardly (upwardly in FIG. 11) from the main body 98 as shown in FIG. 11. Then, the left side pin 40 in FIG. 11, which is disposed rearwardly by a distance d from the right side pin 40, is soon contacted with the corresponding projection 41. Consequently, the tray 32 cannot be advanced any more. Thereupon, the rotation of the drive gear 67 is stopped. As a result, the tray 32 is stopped at the position at which it is pivoted a little to that side (right side in FIG. 11) on which the rack 68 is formed as shown in FIG. 11. While FIG. 11 indicates the inclined condition of the tray 32 in an exaggerated manner for convenience of illustration, actually the inclination is comparatively small, and a user will recognize that the tray 32 and the main body 98 extend substantially in parallel to each other.

When the tray 32 is at the position described just above, if a disk is placed onto the recessed portion 38 of the tray 32 and an instruction of loading is issued, then the loading motor 61 is energized to rotate in the direction opposite to that described above. Consequently, the drive gear 67 is rotated in the clockwise direction in FIG. 11. In this instance, since the rack 68 is provided on only one side of the tray 32 as described hereinabove, the force of the drive gear 67 acts only upon the rack 68 side of the tray 32, and consequently, a moment acts upon the tray 32 so that it pivots the tray 32 in the clockwise direction in FIG. 11. However, as described hereinabove, the tray 32 is already at its stopped position wherein it is pivoted a little in the clockwise direction. As a result, the tray 32 cannot be pivoted any more in the clockwise direction. Accordingly, the tray 32 is retracted smoothly toward the main body 98 side without play.

It is to be noted that, while, in FIG. 11, the pin 40 and the projection 41 are formed also on the right sides of the tray 32 and the main chassis 31, respectively, for convenience of description, such stoppers provided by the right side pin 40 and the right side projection 41 are not formed actually in the disk loading apparatus of the present embodiment. Instead, upon unloading, the engagement between the pin 71b of the pivotal plate 71 and an end portion 67e of the cam 67c takes place in time a little earlier than the engagement between the pin 40 and the projection 41 as seen from FIG. 7. In particular, upon unloading, after the pin 71b and the end portion 67e are engaged with each other to stop rotation of the drive gear 67, the tray 32 tends to further advance by its own inertia. As a result, the right side of the tray 32 is stopped at the position at which the pin 71b and the end portion 67e are engaged with each other, but the left side is further advanced and is then stopped at a position at which the pin 40 and the projection 41 are engaged with each other.

If the drive gear 67 rotates in the clockwise direction to retract the tray 32 toward the main body 98 side, when the tray 32 is moved to a predetermined position, the pin 71b of the pivotal plate 71 is lifted by the inclined face 67d of the cam 67c as seen from FIG. 7. As a result, the pivotal plate 71 is pivoted in the counterclockwise direction in FIG. 9 around the common axis of the projections 71a. Consequently, also the turntable chassis 51 is lifted upwardly in FIG. 9. Then, when the pin 71b reaches an upper side groove (FIG. 7) of the cam 67c, the pivotal plate 71 and the turntable chassis 51 come to their individual horizontal positions (FIG. 10). In this instance, the turntable 53 is fitted into the center hole of the disk. Then, the chucking pulley 34b presses the disk against the turntable 53. Accordingly, the turntable 53 can thereafter be rotated to reproduce information from the disk.

In the meantime, while the disk player is normally used in a horizontally placed condition, it sometimes occurs that an instruction of unloading is issued in error while the disk player is placed vertically. In particular, an instruction of unloading may be issued while the disk player is in a position pivoted by 90 degrees in the clockwise direction from the position shown in FIG. 10. In this instance, since the turntable chassis 51 and the pivotal plate 71 are pivoted in their sinking direction as described hereinabove, the disk placed on the turntable 53 may drop downwardly (rightwardly in FIG. 10). Here, since the arresting portions 36 are formed on the tray 32, the disk is arrested by the arresting portions 36 and is prevented from dropping to the interior of the body 98 any more. Further, in order to make the arresting engagement by the arresting portions 36 surer, a projected portion 33b is formed on the chucking plate 34 and extends to a position in the proximity of the arresting portion 36. As a result, when the disk drops, it is prevented from being inclined to such a degree that it jumps over the arresting portions 36. As a result, the disk 99 is arrested by the arresting portions 36 with certainty.

Figure 12:
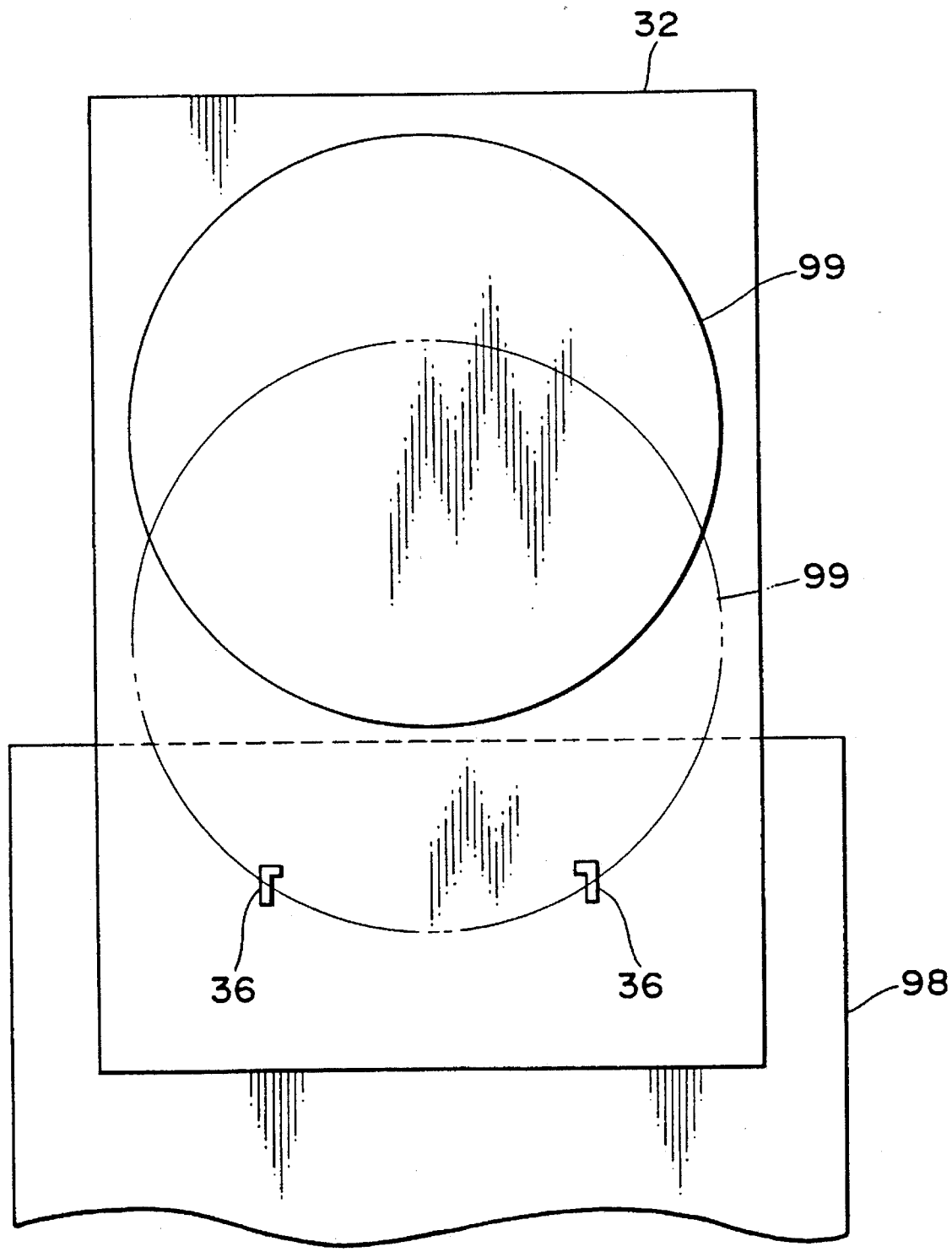
FIG. 12 is a schematic view of the tray at a position at which a disk is arrested by an arresting element.
Figure 13:
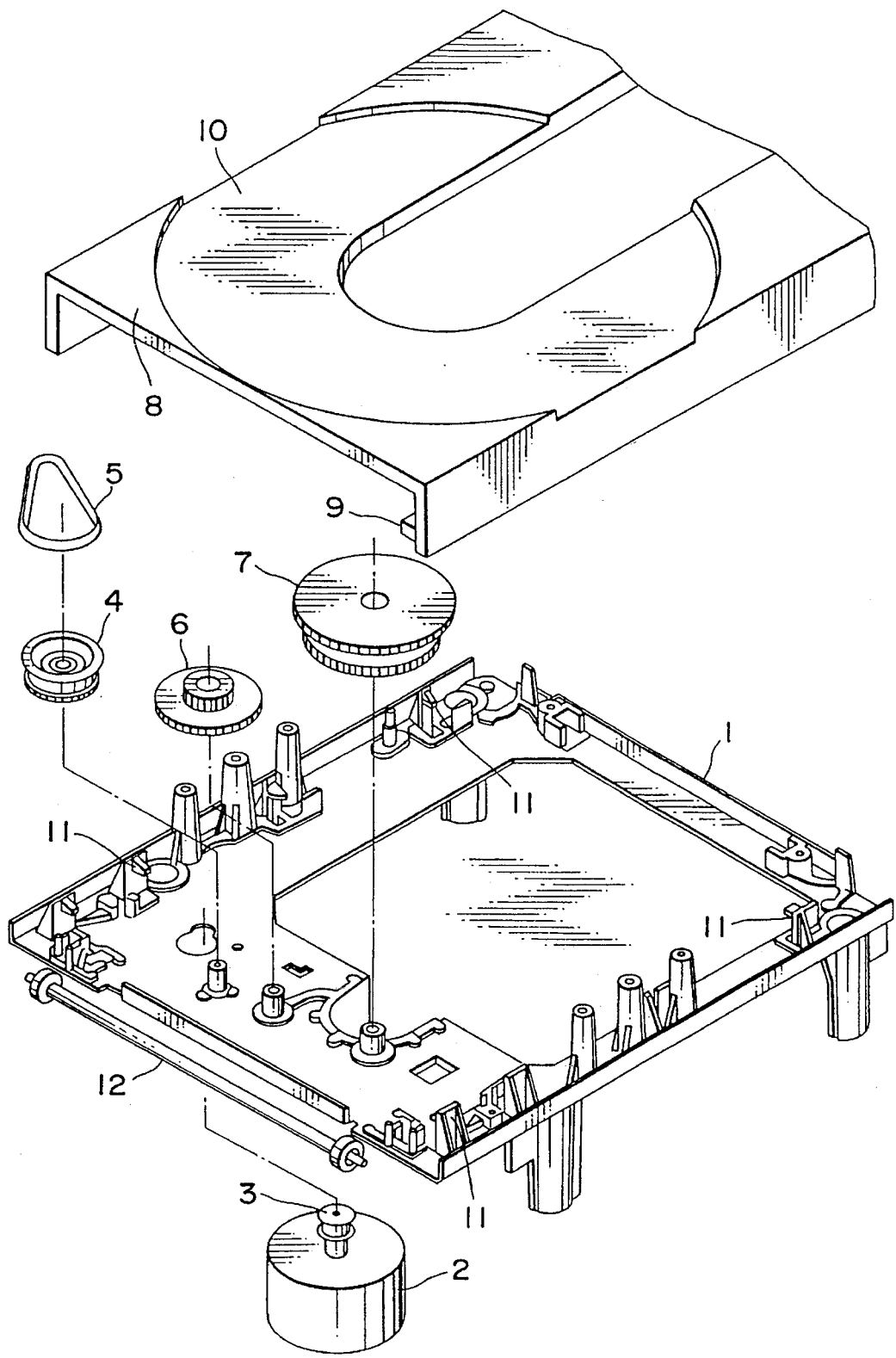
FIG. 13 is an exploded perspective view showing an exemplary one of conventional compact disk players.

The position of the arresting portions 36 is set so that, when the tray 32 thereafter comes to a predetermined position advanced from the main body 98, the disk 99 arrested by the arresting portions 36 is exposed sufficiently from the main body 98 as seen from FIG. 12. Accordingly, the user can take out the disk 99 arrested by the arresting portions 36 with certainty. When the disk 99 is in position, naturally the disk 99 can be removed readily from the tray 32.

Having now fully described the invention, it will be apparent to one of ordinary skill in the art that many changes and modifications can be made thereto without departing from the spirit and scope of the invention as set forth herein.

What is claimed is:

1. A disc drive comprising:

a main chassis having a first main connecting member and a second main connecting member;

a turntable having a top surface for carrying a disc;

a motor connected to the turntable for rotationally driving the turntable;

an optical pickup;

a turntable chassis having a first turntable connecting member and a second turntable connecting member, the turntable chassis being connected to the motor and the optical pickup;

a first shock absorber connected to the first turntable connecting member and the first main connecting member so that the turntable chassis rotates towards and away from the main chassis around a first axis of rotation defined by an intersection of a plane of the first turntable connecting member and the first main connecting member;

a pivotal chassis having a first pivotal connecting member and a second pivotal connecting member, the second pivotal connecting member being rotatably connected to the second main connecting member so that the pivotal chassis rotates towards and away from the main chassis around a second axis of rotation defined by the second pivotal connecting member and the second main connecting member;

a second shock absorber continuously connected to the first pivotal connecting member and the second turntable connecting member so that, as the pivotal chassis rotates towards and away from the main chassis, the pivotal chassis forces the turntable chassis to move towards and away from, respectively, the main chassis around a third axis of rotation defined by an intersection of a plane of the second turntable connecting member and the first pivotal connecting member; and second driving means for moving the pivotal chassis towards and away from the main chassis.

2. The disc drive according to claim 1, wherein the second driving means comprises a drive gear having a cam portion, and a drive device for rotationally driving the drive gear, and wherein the pivotal chassis comprises a plate shape with an engaging portion that moves towards and away from the main chassis along the cam portion.

3. The disc drive according to claim 1, and further comprising a disc transporting member connected to the second driving means having a recess portion, the disc transporting member being moved by the second driving means between an outside position in which a disc may be inserted into the recess portion, and an inside position in which the recess portion is positioned within the disc drive.

4. The disc drive according to claim 3, wherein the second driving means comprises a drive gear having a cam portion, and a drive device for rotationally driving the drive gear, wherein the drive gear is engaged to the disc transporting member, and wherein the pivotal chassis comprises an engaging portion that moves [between the first position and the second position]towards and away from the main chassis along the cam portion.

5. The disc drive according to claim 1, wherein the pivotal chassis comprises a plate shape.

6. The disc drive according to claim 1 wherein the first shock absorber comprises an elastic member that has a pair of outwardly swollen portions and an inwardly recessed concave portion formed therebetween connected to the first turntable connecting member, and a central opening connected to the first main connecting member.

7. The disc drive according to claim 1 wherein the first axis of rotating and the second axis of rotation are substantially parallel.

8. The disc drive according to claim 1 wherein the second shock absorber comprises an elastic member that has a pair of outwardly swollen portions and an inwardly recessed concave portion formed therebetween connected to the second turntable connecting member, and a central opening connected to the first pivotal connecting member.

* * * * *

UNITED STATES PATENT AND TRADEMARK OFFICE
CERTIFICATE OF CORRECTION

PATENT : 5,608,705
DATED : March 4, 1997
INVENTOR(S) : Akora Tanaka

It is certified that error appears in the above-identified patent and that said Letters Patent is hereby corrected as shown below:

In Col. 8, lines 16-17, after the word "moves" and before the word "towards", please delete " [between the first position and the second position]"

Signed and Sealed this

First Day of July, 1997

Attest:

BRUCE LEHMAN

Attesting Officer

Commissioner of Patents and Trademarks